United States Patent [19]

McLaughlin et al.

[11] Patent Number: 4,737,244

[45] Date of Patent: Apr. 12, 1988

[54] ZIRCONIUM AND HAFNIUM TETRACHLORIDE SEPARATION BY EXTRACTIVE DISTILLATION WITH MOLTEN ZINC CHLORIDE LEAD CHLORIDE SOLVENT

[75] Inventors: David F. McLaughlin, Oakmont; Richard A. Stoltz, Murrysville, both of Pa.

[73] Assignee: Westinghouse Electric Corp., Pittsburgh, Pa.

[21] Appl. No.: 943,030

[22] Filed: Dec. 18, 1986

[51] Int. Cl.$^4$ .................. B01D 3/40; C01G 25/04; C01G 27/04
[52] U.S. Cl. ................................. 203/51; 203/84; 423/73; 423/76; 423/492
[58] Field of Search .................. 203/51, 50, 78, 84; 423/73, 75, 76, 492; 75/84.4, 84.5, 84

[56] References Cited

U.S. PATENT DOCUMENTS

| | | | |
|---|---|---|---|
| 1,582,860 | 4/1926 | van Arkel | 423/73 |
| 2,741,628 | 4/1956 | Plucknett | 556/55 |
| 2,744,060 | 5/1956 | Eaton | 203/50 |
| 2,791,485 | 5/1957 | Newnham | 423/76 |
| 2,816,814 | 12/1957 | Plucknett | 203/71 |
| 2,852,446 | 9/1958 | Bromberg | 203/1 |
| 2,928,722 | 3/1960 | Scheller | 203/51 |
| 2,938,769 | 5/1960 | Overholser | 423/70 |
| 3,006,719 | 10/1961 | Miller | 423/70 |
| 3,671,186 | 6/1972 | Ishizuka | 423/73 |
| 3,966,458 | 6/1976 | Spink | 75/84.5 |
| 4,021,531 | 5/1977 | Besson | 423/492 |
| 4,072,506 | 2/1978 | Megy | 75/63 |

FOREIGN PATENT DOCUMENTS 2543162 9/1984 France.

OTHER PUBLICATIONS

Niselson et al.; "The Solid–Liquid Equilibria in Binary Systems Formed by ZrCl$_4$HfCl$_4$, SnCl$_2$, ZnCl$_2$ and BiCl$_3$"; Jan. 1961; pp. 92–95, vol. 6, #1.
Bloom and Weeks; "Viscosities of Sodium Chloride and Zinc Chloride Melts"; Trans. Faraday Soc.; 67, (1971) pp. 1420–1425.
Mackenzie and Murphy; "Structure of Glass–Forming Halides. II. Liquid Zinc Chloride"; J. of Chemical Physics, vol. 33, No. 2 (Aug. 1960) pp. 366–369.
Plucknett, Hansen & Duke; "Progress Report in Physical and Inorganic Chemistry Group II, III & IV" (Nov. 1, 1948–Apr. 30, 1949), ISC-51, 14 pp. (esp. pp. 8–9).
Hudswell & Hutcheon; "Methods of Separating Zirconium from Hafnium and Their Technical Implications"; Peaceful Uses of Atomic Energy (1955–56); pp. 563–564.
Dutrizac & Flengas; "Pressure–Temperature Measurements of Alkali and Alkalive–earth Complex Chlorides of Zr and Hf"; Advan. Extr. Met. Prop. Symp. (London '67) 28 pages (esp. 20–21).

Primary Examiner—Wilbur Bascomb
Attorney, Agent, or Firm—R. A. Stoltz

[57] ABSTRACT

This is a molten salt extractive distillation process for separating hafnium from zirconium. It utilizes at least principally a ZnCl$_2$-PbCl$_2$ molten salt solvent, and preferably ZnCl$_2$-PbCl$_2$ in a near eutectic or eutectic mixture. The extraction column is preferably run about 370°–390° C. at about one atmosphere and stripping is preferably done at 375°–400° C. utilizing an inert gas carrier.

8 Claims, 2 Drawing Sheets

ZIRCONIUM AND HAFNIUM TETRACHLORIDE SEPARATION BY EXTRACTIVE DISTILLATION WITH MOLTEN ZINC CHLORIDE LEAD CHLORIDE SOLVENT

CROSS REFERENCE TO RELATED APPLICATIONS

A process is described in related application Ser. No. 06/943,112 assigned to the same assignee. Although this related application also provides for zirconium-hafnium separation by extractive distillation with the molten solvent containing zinc chloride, it utilizes at least 80 mole percent zinc chloride, with the remainder including a viscosity reducer of magnesium chloride, calcium chloride, or mixtures thereof, rather than the lead chloride of the instant invention. This copending application is hereby incorporated by reference herein.

BACKGROUND OF THE INVENTION

This invention relates to molten chloride solvent extractive distillation to separate hafnium from zirconium and in particular relates to a zinc chloride-lead chloride solvent to provide the liquid phase.

Naturally occurring zirconium ores generally contain from 1 to 3 percent hafnium oxide relative to zirconium oxide. In order that the zirconium metal be acceptable as a nuclear reactor material, the hafnium content must first be reduced to low levels, due to the high neutron absorption cross section of hafnium. This separations process is difficult due to the extreme chemical similar of the two elements. A number of techniques have been explored to accomplish this separation, with the technique currently in use in the United States involving liquid-liquid extraction of aqueous zirconyl chloride thiocyanate complex solution using methyl isobutyl ketone, generally as described in U.S. Pat. No. 2,938,769, issued to Overholser on May 31, 1960, with the removal of iron impurities prior to solvent extraction as described in U.S. Pat. No. 3,006,719, issued to Miller on Oct. 31, 1961.

Several processes have been suggested for separations of the metal tetrachlorides generated from the ore by carbochlorination. The use of such a nonaqueous separation offers significant economic incentive over those processes requiring aqueous zirconium solutions. Direct distillation of the tetrachlorides provides one possible route, relying on the difference in boiling points between zirconium tetrachloride and hafnium tetrachloride. Unfortunately, direct distillation cannot be accomplished at near atmospheric pressure, since neither tetrachloride exhibits a liquid phase except at very high pressure. U.S. Pat. No. 2,852,446, issued to Bromberg on Sept. 16, 1958 describes a high pressure distillation process where the pressure, rather than a solvent, provides for a liquid phase.

U.S. Pat. No. 1,582,860, issued to van Arkel and de Boer on Apr. 27, 1926 provides a molten salt extractive distillation process utilizing what they described as a zirconium (hafnium) tetrachloride-phosphorus oxychloride compound. U.S. Pat. No. 2,816,814 issued to Plucknett on Dec. 17, 1957, describes extractive distillation for separation of the tetrachlorides using a stannous chloride solvent. U.S. Pat. No. 2,928,722 to Scheller, issued Mar. 15, 1960, describes the batch fractional distillation of niobium and tantalum chlorides to separate these chlorides from each other and from other chloride impurities, and uses a "flux" to provide the molten salt phase, utilizing either zirconium tetrachloride-phosphorus oxychloride or an alkali metal chloride and aluminum (or iron, or zirconium) chloride mixture as the flux. U.S. Pat. No. 3,966,458 issued to Spink on June 29, 1976 provides a sodium-potassium chloride solvent for use in the extractive distillation of zirconium and hafnium tetrachlorides. U.S. Pat. No. 3,671,186 issued to Ishizuka on June 20, 1972, utilizes a series of dissolution and evaporation stages with a solvent such as sodium chloride. U.S. Pat. No. 4,021,531 issued to Besson on Apr. 3, 1977, utilizes extractive distillation with an alkali metal chloride and aluminum (or iron) chloride mixture as the solvent. Extractive distillation of zirconium (hafnium) tetrachloride with a pure zinc chloride solvent has been attempted (Plucknett et al., AEC report ISC-51, 1949), but was unsuccessful due to the formation of a highly viscous two-phase system. The anomalously high viscosity of zinc chloride is described by MacKenzie and Murphy (J. Chem. Phys., 33, 366, 1960).

Of all of the molten salt extractive distillation processes, only the above mentioned Besson process has been brought to commercial development. This process is currently in use in France and provides product zirconium tetrachloride, relatively depleted of hafnium tetrachloride in the liquid bottoms stream and a hafnium tetrachloride enriched vapor stream taken from the top of the column. A relatively high reflux is provided by a condenser at the top of the column and a reboiler at the bottom of the column. Because of the stability of the double salts formed with the alkali metal chloride in the solvent, it is very difficult to completely separate the product zirconium tetrachloride from the solvent, and relatively high (e.g. 500° C.) temperatures are required. Aluminum chloride in excess of 1:1 molar to alkali metal chloride is required and there is considerable carry over of aluminum chloride into the zirconium tetrachloride leaving the stripper. French Pat. No. 2,543,162 (9/28/84) to Brun and Guerin describes a post-stripping process for removing aluminum chloride. In addition, it should be noted that aluminum chloride is an especially corrosive molten salt, and, at higher temperatures, is very difficult to handle.

SUMMARY OF THE INVENTION

This is a molten salt type extractive distillation method for separating hafnium from zirconium, the method being of the type wherein a mixture of zirconium and hafnium tetrachlorides is introduced into an extractive distillation column and a molten solvent is circulated through the column to provide a liquid phase, and in which the extractive distillation column has a reboiler connected to the bottom and a reflux condenser connected to the top. This invention provides the improved process in which the molten salt is at least principally zinc chloride and lead chloride and has a composition of at least 30 mole percent zinc chloride and at least 10 mole percent lead chloride. Preferably the molten solvent consists essentially of zinc chloride and lead chloride and the column is operated essentially isothermally at 360°–400° C. and the liquid taken from the bottom of the column is run through the stripper to remove zirconium tetrachloride product, with the stripper being operated at a temperature of 360°–450° C. (and preferably about 375°–400° C.). Most preferably the molten salt solvent consists essentially of 84 mole percent zinc chloride and 16 mole percent lead chloride.

This invention provides a reasonable viscosity at reasonably operating temperatures, while providing for a lower stripping temperature and less corrosion than prior hafnium-zirconium chloride extractive distillation systems.

BRIEF DESCRIPTION OF THE DRAWINGS

The invention can be better understood by reference to the following drawings, in which.

DESCRIPTION OF THE PREFERRED EMBODIMENTS

Figure 1:
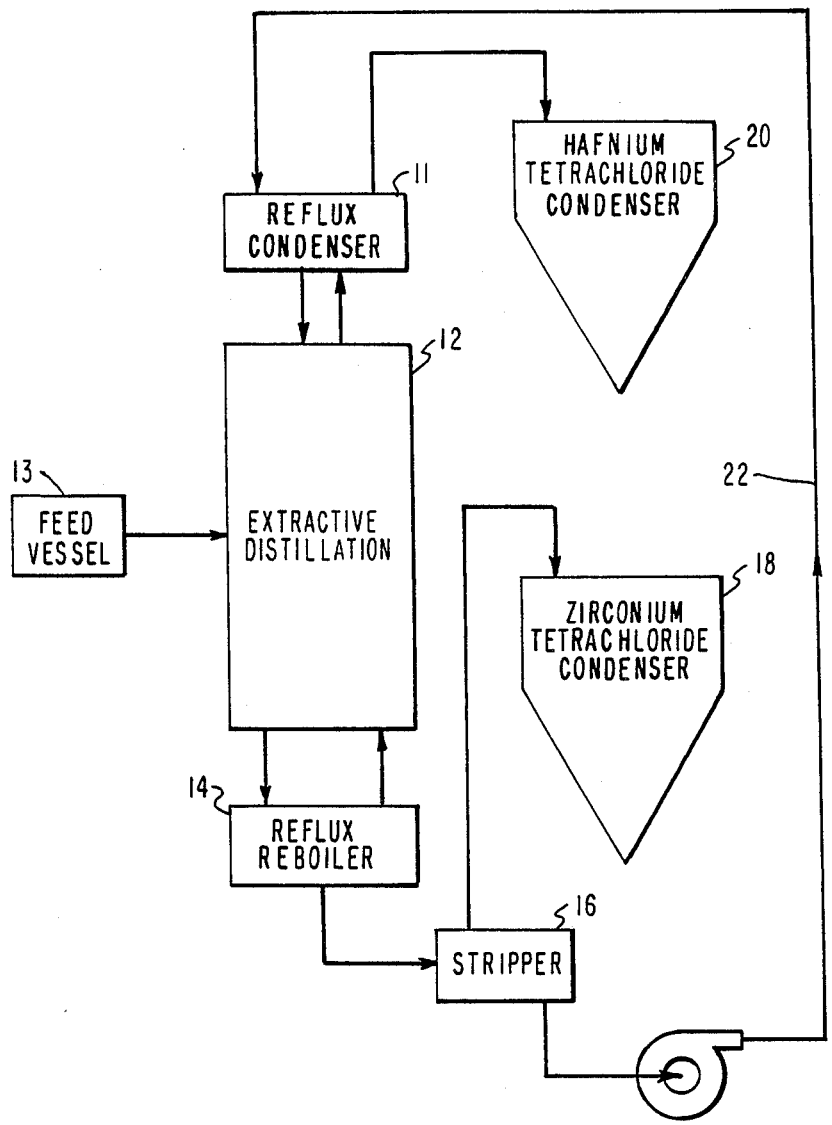
FIG. 1 shows a typical extractive distillation system using a circulated molten salt solvent.

This invention is a molten salt extractive distillation process for separating hafnium from zirconium, using a molten salt solvent to provide a liquid phase at near atmospheric pressures. Generally, as shown in FIG. 1, this is a continuous process in which the molten salt solvent is introduced into the reflux condenser 11 on the top of the extractive distillation column, flows down through the extractive distillation column 12 absorbing zirconium tetrachloride (and at a lesser rate some hafnium tetrachloride) and with hafnium tetrachloride (and at a lesser rate some zirconium tetrachloride) simultaneously evaporating from the liquid phase. Zirconium-hafnium chloride (to be separated) is fed from a feed vessel 13 into the middle of the column 12. The column 12 can be maintained at about 380° C. This results in a zirconium-tetrachloride-rich (e.g. less than 100 parts hafnium per million parts zirconium) liquid exiting through the reflux reboiler 14 at the bottom of the column 12. The bottoms liquid is then run through a stripper 16 to remove the zirconium tetrachloride product (which is collected in zirconium tetrachloride condenser 18) and the solvent stream 22 returned to the top of the column. The hafnium tetrachloride rich vapor (the other product) comes off the top of the column and is collected in hafnium tetrachloride condenser 20.

This invention is similar to the process of the aforementioned Besson patent, but utilizes a different molten salt solvent, which different solvent allows for stripping of the zirconium tetrachloride from the solvent at a much lower temperature. Corrosion is an important consideration in all such molten salt systems, thus reducing temperature as well as the avoiding of the use of excess (uncomplexed) strong Lewis acids, such as aluminum or iron chloride, is very important. This also provides for lower operating costs and can allow the use of less expensive materials of construction.

Preferably, the separation is accomplished using a near eutectic or eutectic molten $ZnCl_2$-$PbCl_2$ mixture as a solvent, allowing stripping at moderate temperatures (375°–400° C.) with an inert gas (e.g. nitrogen) carrier flow. This lower temperature minimizes solvent carryover. The extraction column is preferably run at about 370°–390° C. at about one atmosphere with about 20-30 mole percent $(Zr,Hf)Cl_4$ dissolved in the solvent.

As noted above, the solvent introduced in the top of the column comes from the stripped bottom stream. The use of a zinc chloride-lead chloride solvent does not lead to the formation of double salts. This avoids the problem incurred in alkali metal chloride solvents, as such alkali metal chlorides (and to a lesser extent, some alkaline earth metal chlorides) form stable double salts with the zirconium tetrachloride, requiring high stripping temperatures to accomplish dissociation, even with inert gas purging. In the process of the aforementioned Spink patent, the formation of a liquid phase in the column at temperatures near 350°–400° C. depends on the existence of a low melting ternary eutectic formed between sodium chloride, potassium chloride and the zirconium-hafnium tetrachlorides; thus once the solvent is stripped of tetrachloride, the remaining sodium-potassium chloride has a melting point in the order of 700°–900° C. which poses significant engineering problems in fluid transport and material corrosion.

The stripping temperature of Spink can be somewhat lowered if a strong Lewis acid, such as aluminum trichloride, is added to the alkali metal chloride solvent as in Besson. Thus, for example, aluminum chloride forms a stable complex with potassium chloride, increasing the activity of the zirconium-hafnium tetrachloride, allowing stripping at somewhat more moderate temperatures (e.g. 500° C.). However, with compositions containing enough aluminum chloride that the potassium chloride is relatively fully complexed, the vapor pressure of aluminum chloride becomes appreciable, leading to carryover of considerable aluminum chloride into the product zirconium tetrachloride leaving the stripper. The zirconium tetrachloride vapor is therefore unsuitable for direct reduction, and additional aluminum chloride removal processing steps must be introduced.

This invention provides an extractive distillation solvent which does not form stable double salts yet still exhibits reasonable tetrachloride solubilities, which has low enough melting temperatures that the stripped solvent may be recirculated for reflux as a liquid without undue corrosion or material handling problems.

The primary difficulty with pure zinc chloride as an extractive distillation solvent is its anomalously high viscosity. As mentioned previously, the attempt to do extractive distillation of zirconium-hafnium tetrachloride with a pure zinc chloride solvent was unsuccessful due to the formation of a highly viscous two-phase system, as noted in the above-cited Plucknett AEC report. However, the viscosity may be reduced by the addition of a second component. For example, a viscosity reduction of nearly an order of magnitude by the addition of 10 mole percent sodium chloride was described by Bloom and Weeks (Transactions of the Faraday Society, 67, 1420, 1971). If used with $ZrCl_4$, however, such a $NaCl$-$ZnCl_2$ mix would lead to the formation of the $ZrCl_4$-$NaCl$ double salt and would require higher column and stripping temperatures and thus would not provide a good distillation solvent.

Figure 2:
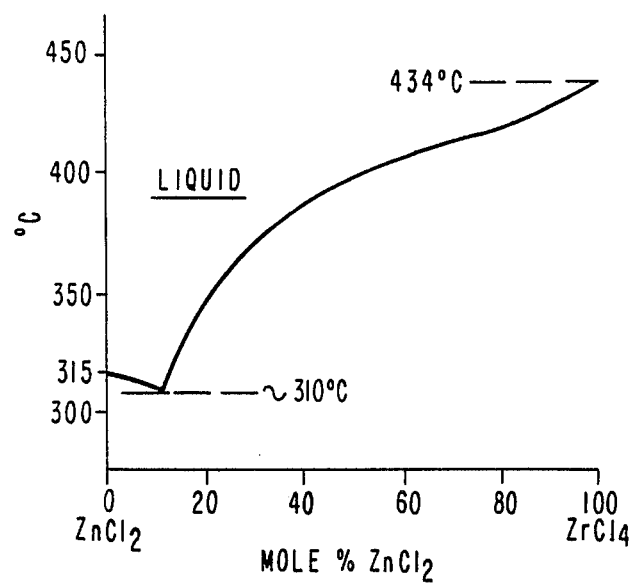
FIG. 2 is a phase diagram for $ZnCl_2$-$ZrCl_4$.

The solvent of this invention possesses a low vapor pressure which prevents excessive carryover into the stripped vapor product. In addition, the very small quantities of zinc and lead which do carry over are generally eliminated in later processing and do not present a problem in the final zirconium. The phase diagram for zinc dichloride-zirconium tetrachloride (in molar percent) is illustrated in FIG. 2 (Nisel'son, Ivanov-Emin, and Larionova, Russ. J. Inorg. Chem.). No distectic points are observed, indicating that no stable double salts are formed in this system. At 360° C., the solubility of zirconium tetrachloride in zinc chloride is apparently at least about 20 mole percent. The vapor pressure of zinc chloride at a stripping temperature of 400° C. would be only 0.4 Torr, so that carryover of zinc into the product stream is minimal. In addition, zinc metal is relatively volatile, and will be effectively removed from the final zirconium or Zircaloy product during subsequent melting processes.

Figure 3:
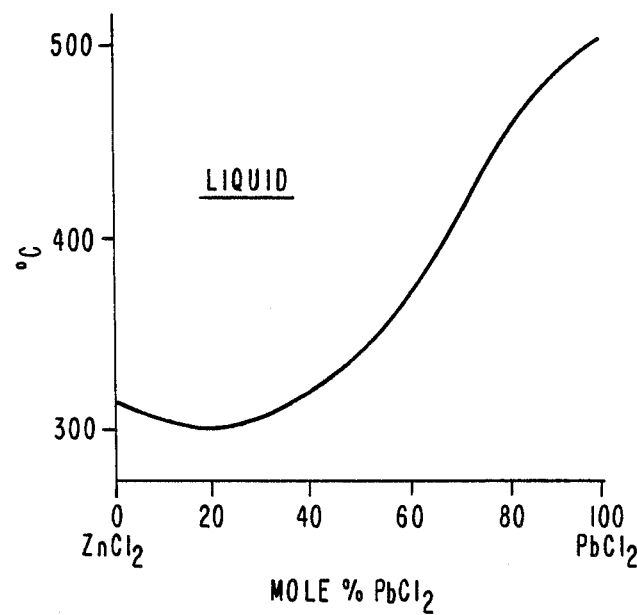
FIG. 3 is a phase diagram for $ZnCl_2$-$PbCl_2$.

This invention uses a molten mixture of lead dichloride and zinc chloride, preferably at or near the eutectic composition of 16 mole percent of lead chloride, as illustrated in the binary zinc chloride-lead chloride phase diagram in FIG. 3. (Ugai and Shatillo, J. Phys. Chem., USSR, 23, 746, 1949). Lead chloride generally possesses the same desirable properties as $ZnCl_2$ (low vapor pressure, the absence of stable double salts with zirconium or hafnium tetrachloride, and high volatility as a metal and therefore easy removal during melting of the zirconium or Zircaloy). While lead can have multiple valences, it can be maintained as the dichloride, by, for example, contacting the molten salt with zirconium metal.

This process generally can be operated generally in the same manner as the aforementioned Besson U.S. Pat. No. 4,021,531, but the use of the solvent of this invention avoids the stripper ("exhaustion column") problems incurred in Besson, and avoids the need for additional processing to remove aluminum chloride, such as described in the aforementioned Brun and Guerin French Pat. No. 2,543,162.

Thus it can be seen that the solvent of this invention can be used for the extractive distillation separation of zirconium and hafnium. It allows lower temperature operation of the stripper, mimimizes corrosion, and minimizes the carryover of solvent with the product.

The invention is not to be construed as limited to the particular examples described herein, as these are to be regarded as illustrative rather than restrictive. The invention is intended to cover all processes which do not depart from the spirit and scope of the invention.

What we claim is:

1. In an extractive distillation method for separating hafnium tetrachloride from zirconium tetrachloride of the type wherein a mixture of zirconium and hafnium tetrachlorides is introduced into an extractive distillation column, which extractive distillation column has a reboiler connected at the bottom and a reflux condenser connected at the top and wherein a molten salt solvent is circulated into the reflux condenser and through the column to provide a liquid phase, and wherein molten salt solvent containing zirconium tetrachloride is taken from the reboiler and run through a stripper to remove zirconium tetrachloride product from said molten salt solvent and the stripped molten salt solvent is returned to the reflux condenser and hafnium tetrachloride enriched vapor is taken as product from the reflux condenser, the improvement comprising:

said molten salt solvent having a composition of at least 30 mole percent zinc chloride and at least 10 mole percent of lead chloride.

2. The method of claim 1, wherein said molten salt solvent consists essentially of zinc chloride and lead chloride.

3. The method of claim 2, wherein said column is operated essentially isothermally at 360°–400° C.

4. The method of claim 3, wherein said column is operated at a pressure of about one atmosphere.

5. The method of claim 3, wherein said column is operated essentially isothermally at about 375° C.

6. The method of claim 2, wherein said molten salt solvent consists essentially of about 84 mole percent zinc chloride and 16 mole percent lead chloride.

7. The method of claim 2, wherein said stripper is operated at a temperature of 360°–450° C.

8. In an extractive distillation method for separating hafnium tetrachloride from zirconium tetrachloride of the type wherein a mixture of zirconium and hafnium tetrachlorides is introduced into an extractive distillation column, which extractive distillation column has a reboiler connected at the bottom and a reflux condenser connected at the top and wherein a molten salt solvent is circulated through the column to provide a liquid phase, and wherein molten salt solvent containing zirconium tetrachloride is taken from the reboiler and run through a stripper to remove zirconium tetrachloride product from said molten salt solvent and the stripped molten salt solvent is returned to the reflux condenser and hafnium tetrachloride enriched vapor is taken as product from the reflux condenser, the improvement comprising:

said molten salt solvent having a composition consisting essentially of about 84 mole percent zinc chloride and 16 mole percent lead chloride and wherein said stripper is operated at a temperature of 360°–450° C.

* * * * *